United States Patent [19]

Slutz

[11] Patent Number: 5,304,014

[45] Date of Patent: Apr. 19, 1994

[54] APPARATUS FOR LAYING OUT AND TAKING UP A LONG LENGTH, WIDE WIDTH FLEXIBLE SHEETING

[75] Inventor: John D. Slutz, Canton, Ohio

[73] Assignee: JMW Welding & Manufacturing, Inc., Canton, Ohio

[21] Appl. No.: 22,517

[22] Filed: Feb. 25, 1993

[51] Int. Cl.⁵ .................................... E02B 3/12
[52] U.S. Cl. .................... 405/129; 111/200; 414/724; 414/911; 405/270; 47/56
[58] Field of Search .......... 405/128, 129, 270; 111/200, 199; 414/724, 911; 47/28.1, 9 M, 9 S

[56] References Cited

U.S. PATENT DOCUMENTS

| | | | |
|---|---|---|---|
| 3,667,633 | 6/1972 | Cappella | 414/724 |
| 4,050,972 | 9/1977 | Cardinal | 47/28.1 X |
| 4,084,763 | 4/1978 | Zanboni | 414/911 X |
| 4,175,496 | 11/1979 | Rehbein | 111/200 |
| 4,513,530 | 4/1985 | Nyboer | 47/9 M |
| 4,636,112 | 1/1987 | Raviv | 405/270 |
| 4,720,212 | 1/1988 | Steenbergen et al. | 405/270 |
| 4,724,781 | 2/1988 | Higashimota et al. | 11/200 |
| 4,828,432 | 5/1989 | Ives | 405/270 |
| 4,872,784 | 10/1989 | Payne | 405/270 |
| 4,878,542 | 11/1989 | Brouwer et al. | 414/911 X |
| 4,909,667 | 3/1990 | DeMello | 405/129 X |
| 4,927,317 | 5/1990 | Acosta | 414/724 |
| 4,955,759 | 9/1990 | Payne | 405/270 |
| 5,082,397 | 1/1992 | Raviv | 405/270 |

Primary Examiner—Dennis L. Taylor
Attorney, Agent, or Firm—Paul E. Milliken; Lee A. Germain

[57] ABSTRACT

This invention provides an apparatus for use on and carried by a powered vehicle for laying out and taking up a long length, wide width flexible sheeting material as may be used to cover a sanitary landfill site, the apparatus having a framework adapted for mounting engagement on the vehicle and characterized by a pair of transversely extending arms which carry a journalled arbor assembly between them. The arbor assembly is powered for rotational motion and is controlled by an operator in a manner to either load a flexible sheeting material onto a mandrel of the arbor assembly or offload flexible sheeting material from the mandrel as the vehicle travels over a ground surface area.

22 Claims, 5 Drawing Sheets

APPARATUS FOR LAYING OUT AND TAKING UP A LONG LENGTH, WIDE WIDTH FLEXIBLE SHEETING

FIELD OF THE INVENTION

This invention generally pertains to apparatus for temporarily covering a substantially large land area with a flexible sheeting material to protect the area when it is not being worked.

More particularly, this invention pertains to an apparatus which may be used in conjunction with other powered equipment for laying out a substantially long length of a wide width flexible sheeting material to temporarily cover a sanitary landfill site when it is not being worked and to take up the sheeting material when it desired to work the area.

Specifically, this invention provides an apparatus which includes a power driven arbor assembly that is configured to carry a substantial length of a wide width flexible sheeting material, the apparatus adapted for a mounting engagement with a vehicle dozer such that the sheeting may be unrolled and thus deposited onto a landfill site for temporarily covering the site area and which may be applied for taking up the sheeting by rolling it back onto the arbor assembly for stowage and future use.

BACKGROUND OF THE INVENTION

While this invention may be applied to various type uses, it is particularly applicable to sanitary landfill sites wherein a requirement exists which forces a site operator to cover a working area overnight or when the site area is not being worked. Conventionally, the working area is covered with a layer of soil but this requires the use of limited equipment and personnel which could be used otherwise. In an alternative method of covering the landfill site, personnel manually position a flexible sheeting material or tarpaulin over an area which must be covered to meet the requirement imposed for this operation. This, of course, requires that the personnel work in contact with the debris or refuse which was dumped into the landfill site. A need exists, therefore, for an apparatus which may be applied to covering a landfill site and which requires the use of a minimal number of personnel and equipment to accomplish the task.

It is, therefore, in accordance with one aspect of the present invention an object to provide an apparatus which may be used in conjunction with presently available powered equipment to efficiently lay out long lengths of a wide width flexible sheeting material over a sanitary landfill site and which may also be used to take up the flexible sheeting when it is desired to work the site.

In accordance with another aspect of the invention it is an object to provide an apparatus which may be carried on a vehicle dozer blade and which has a powered arbor assembly adapted for carrying a long length of a wide width flexible sheeting and which may lay out or take up the sheeting as the vehicle moves over a site area.

According to another aspect of the invention it is an object to provide an apparatus which may be fabricated using conventional techniques and/or materials and which will provide an economical alternative to presently applied methods and/or equipments for covering sanitary landfill sites.

SUMMARY OF THE INVENTION

The beforementioned objects and other objects and advantages of the invention are accomplished in an apparatus which comprises a framework adapted for mounting engagement onto a powered vehicle, the framework having a pair of transversely positioned arms at either end which include means for journal-mounting a shaft between them; an arbor assembly including a long, substantially cylindrical mandrel having each of its ends journalled to one of the pair of framework arms; and means to power and control rotation of the arbor assembly in a first direction of rotation for wrapping a wide width, long length flexible sheeting material onto the mandrel and in an opposite direction of rotation for unwrapping the sheeting material from the mandrel; wherein the wrapping and unwrapping of the flexible sheeting material may be accomplished as the powered vehicle is moved in either of its forward and reverse directions of travel.

BRIEF DESCRIPTION OF THE DRAWINGS

The various features and advantages of the present invention will become apparent and better appreciated from a consideration of the following detailed description when taken in conjunction with the accompanying drawings, in the several figures in which like-reference numerals are used to identify like parts or elements and wherein.

DETAILED DESCRIPTION OF THE INVENTION

Figure 1:
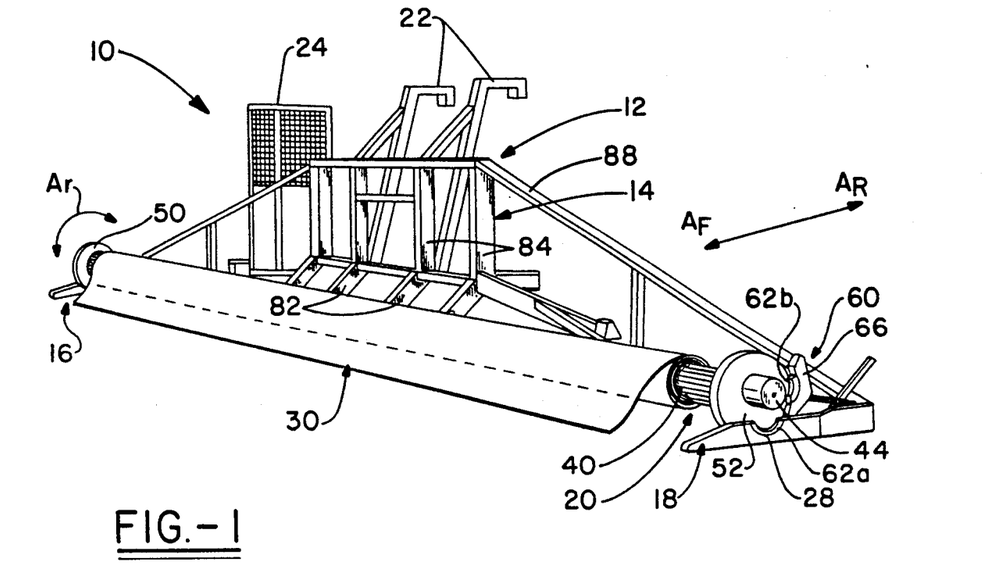
FIG. 1 is a front perspective view of the apparatus of the invention illustrating a condition prior to its being used for the purpose of laying out a flexible sheeting that is wrapped onto an arbor assembly of the apparatus.
Figure 2:
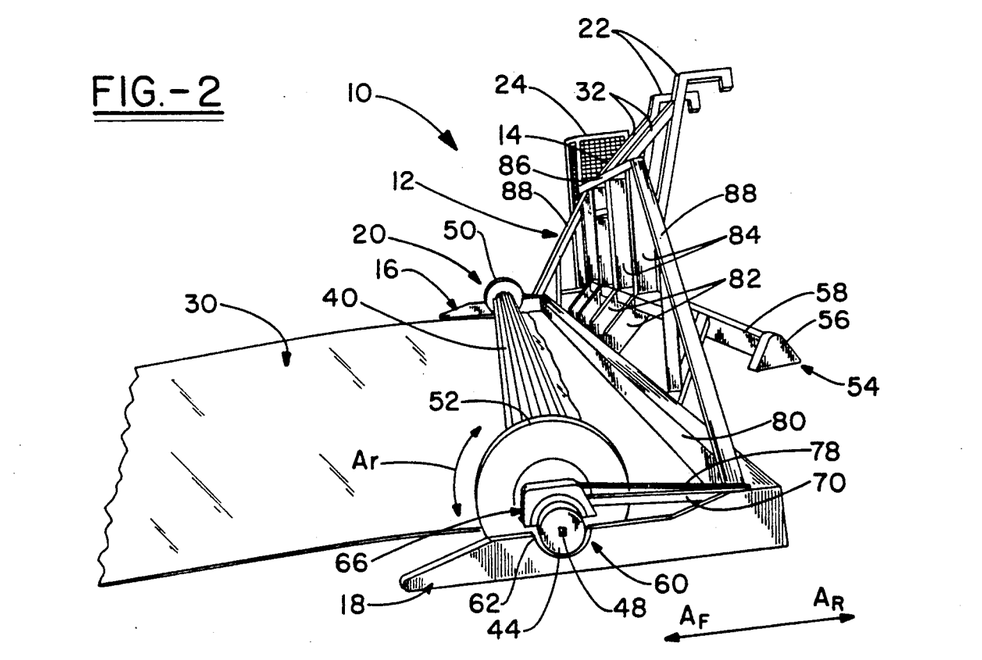
FIG. 2 is a side perspective view of the apparatus shown in FIG. 1.

Referring firstly to FIGS. 1 and 2 of the drawings, an apparatus according to this invention is illustrated and generally indicated by reference numeral 10. Very generally, the apparatus 10 comprises a framework 12 that is characterized by a main body 14 having a pair of transversly extending arms 16 and 18 which are adapted for carrying an arbor assembly 20 between them in a journalled arrangement. The arbor assembly 20 functions to carry a substantial length of a wide-width flexible sheeting material 30 about its surface extent and because of its journalled mounting to the arms 16 and 18 it may be rotated about its central longitudinal Ax axis in either of the directions indicated by the reference arrow Ar.

When the arbor assembly 20 is rotated in one of the directions, sheeting material 30 may be loaded onto it and when it is rotated in the opposite direction, sheeting material 30 may be off-loaded from it. The direction of rotation and whether flexible sheeting is loaded onto or off-loaded from the arbor assembly is not critical in operation of the apparatus 10.

Figure 4:
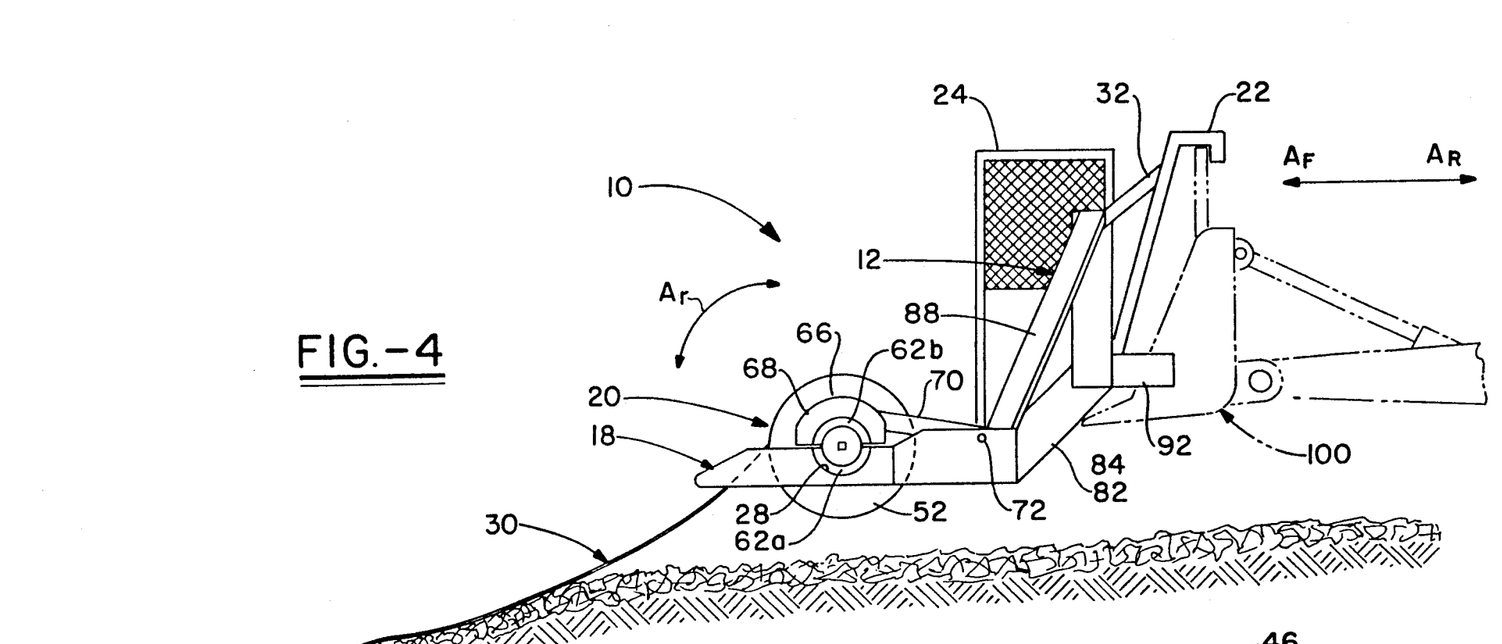
FIG. 4 is a side elevational view of the apparatus illustrating a manner of application, the ghost-line portion being for the purpose of environment as such pertains to its utility in conjunction with a vehicle dozer blade.

The apparatus 10 is adapted for a mounting engagement with a powered vehicle (not shown) and this may be accomplished via various techniques, a particular one being illustrated in FIG. 4 of the drawings wherein a pair of rearwardly extending braces 22 are configured for attachment to a top edge of a vehicle dozer blade shown in ghost dotdashed lines and indicated generally in the figure by reference numeral 100. From this very general description and a consideration of the showing in FIG. 4 it can be appreciated that the apparatus 10 may be applied to loading a long length of a wide-width flexible sheeting 30 onto the arbor assembly 20 when a dozer type vehicle is moved forwardly in the direction of reference arrow AF and, it may be applied to off-loading the sheeting material when the dozer vehicle moves rearwardly in the opposite direction of reference arrow $A_R$.

Figure 3:
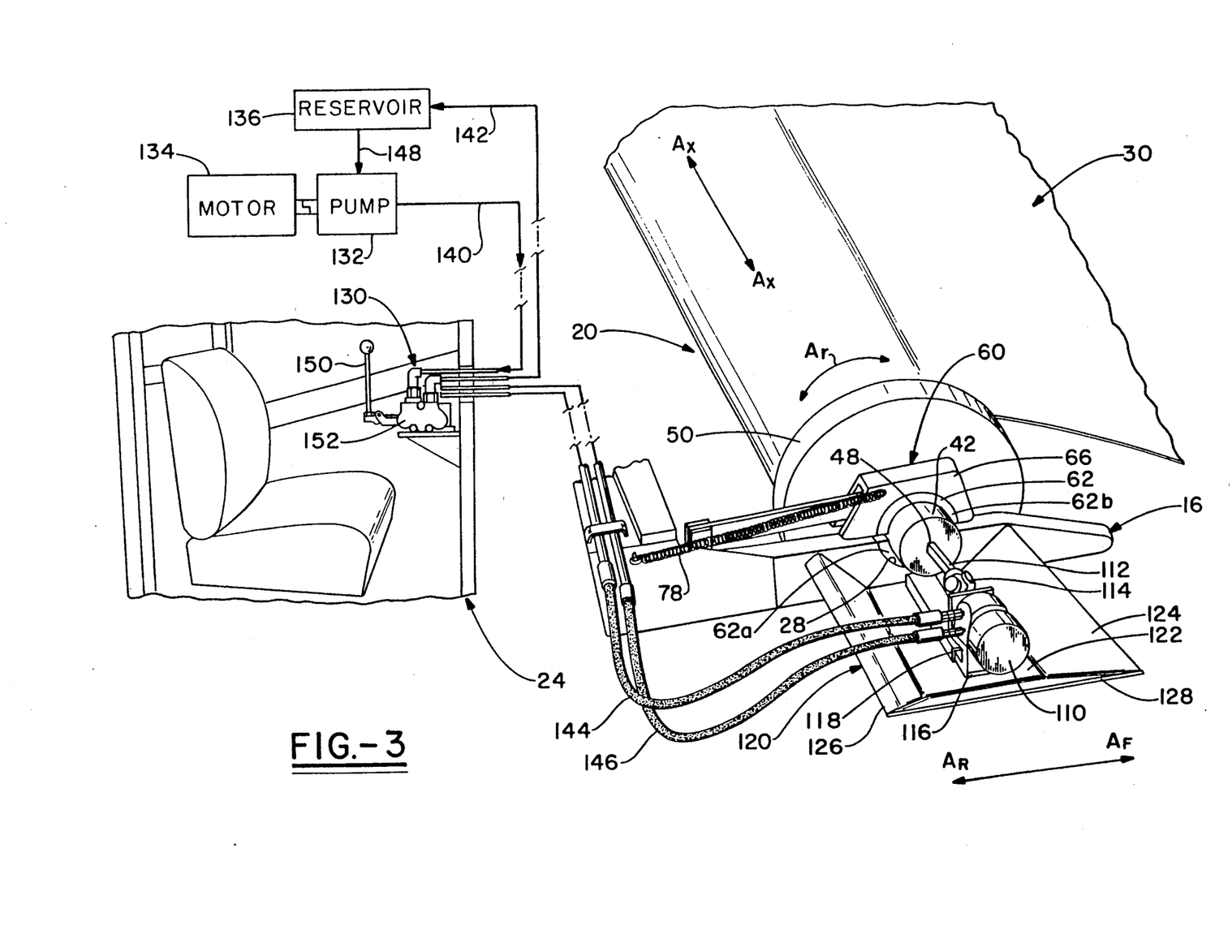
FIG. 3 is a partial perspective view illustrating both pictorially and schematically a hydraulic power drive system which maybe applied for rotating the arbor assembly.
Figure 5:
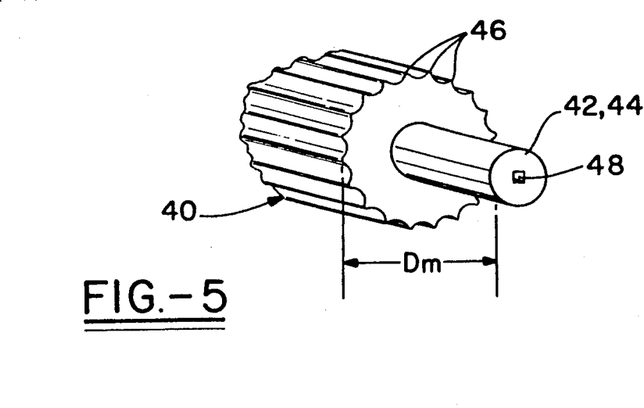
FIG. 5 is a partial perspective view of one end of a preferred embodiment of the mandrel illustrating a particular surface configuration thereof.

More specifically and referring now also to FIGS. 3 and 5 of the drawings, the arbor assembly 20 comprises a long shaft or mandrel 40 which may be a solid piece or a hollow cylindrical member having closed terminal ends at numerals 42 and 44. Whether the member 40 is solid or hollow will, of course, depend upon the strength characteristics of the material used in its fabrication. This invention, therefore, is not considered limited to the particular materials used or the fabrication method used in preparing the member 40. In this respect also, the member 40 will hereinafter be termed a "mandrel" inasmuch as the member 40 is applied to winding and unwinding the sheeting material 30 onto its surface extent in the manner of a mandrel. Continuing, the mandrel 40 may exhibit any of various geometrical transverse cross-sectional shapes including square, triangular, hexoganal, octagonal, or any other shape which will function to provide a surface contour conducive for a gripping engagement with various types of flexible sheeting materials 30 such that the sheeting may be rolled onto and off of the mandrel without excessive slippage. Preferably, the mandrel 40 will have a surface comprised of a plurality of longitudinally extending ribs 46 as illustrated in FIG. 5 of the drawings. The ribs 46 will provide a gripping engagement with at least a first ply of the sheeting material 30 when it is wound about the surface extent of the mandrel. Other means and/or methods of gripping the flexible sheeting 30 may be applied to the invention such as, for example, using various types of fasteners which may be affixed to the mandrel at suitable locations to grab the sheeting so that it may be rolled onto the mandrel. Obviously, there are many fastening means and well-known techniques for holding the flexible sheeting material to the mandrel such that it may be rolled onto it. The invention, therefore, is not considered limited to a particular means and/or method of accomplishing this.

The arbor assembly 20 also comprises a pair of disk configured members 50 and 52, a disk member being located at each end 42 and 44 of the mandrel 40. The disks 50 and 52 exhibit diameters which are substantially larger than the diameter $D_m$ of the mandrel 40 and these function to contain the flexible sheeting 30 between them and to maintain a proper alignment and orientation of the sheeting as it is either taken up onto the mandrel or let off of the mandrel in the operation of the apparatus 10.

The disks 50 and 52 are preferably of a solid construction and exhibit a width or thickness dimension so as to also function as auxilliary wheels for the arbor assembly 20. In this respect, the disks 50 and 52 may be mounted to the mandrel 40 in a fixed position or, alternatively, they may be mounted such as to be independently rotatable with respect to the mandrel 40. In either of the mounting arrangements, it can be appreciated that the arbor assembly 20 may be manually rolled over the ground surface via the disks 50 and 52 and thus be used to manually position the arbor assembly 20 between the framework arms 16 and 18 for pickup by the arms when the framework 12 is raised. In this respect, the showing of FIG. 1 is of the arbor assembly 20 prior to its operational engagement with the arms 16 and 18 while the showing of FIG. 2 is of the arbor assembly when it is in operational engagement with the arms 16 and 18.

The operational engagement of the arbor assembly 20 with the framework arms 16 and 18 is accomplished via a bearing assembly generally indicated by reference numeral 60 in the drawings. The bearing assembly 60 comprises any type of ball bearing or bushing configuration which will meet the duty requirements of the invention. Preferably, a bushing 62 is configured such that a one-half section 62a is carried within an axial groove 26 in the arm 16 and in an axial groove 28 in the arm 18 while the other half section 62b is carried within a latch member 66 at each end of the arbor assembly 20. The latch members 66 each comprise a bushing container 68 which is affixed to the end of an arm 70 that is pivotably mounted via a pin 72 to the rearward end of the arms 16 and 18. The latch members 66 function to capture the terminal ends 42 and 44 of the mandrel 40 within a bearing assembly 60 for rotational operation of the mandrel 40. The latch members 66 may also include a spring 78 affixed at one of its ends to the frame 14 or to the rearward end of an arm 16 or 18 while the opposite end is affixed to a bushing container 68. In this manner and when the arbor assembly is to be either loaded onto or off of the arms 16 and 18, the latch members 66 may be rotated out of the way and held in place via the springs 78.

With respect to the framework 12, any configuration of framework and any types of materials may be used which will meet the strength requirements imposed in the use of this invention. A particular framework 12 is illustrated in the drawings and it comprises at least one base member 80 which extends the longitudinal length of an arbor assembly 20 which may be carried between the transversely positioned arms 16 and 18. The base member 80 may have affixed to it a plurality of evenly spaced bracing members 82 and these may carry a like plurality of vertically extending braces 84 in the manner illustrated. The top ends of the braces 84 may be affixed to a top bracing member 86 and this completes a substantially rectangularly-shaped main body framework 14. From this framework side bracing members 88 may be extended to the transverse arms 16 and 18 to provide support for the ends of the apparatus 10. This is, of course, a recognized and understood mechanical truss arrangement.

When the framework 12 is to be carried on a vehicle dozer blade 100 as illustrated in FIG. 4 of the drawings, it is important that the apparatus 10 be mounted in a substantially stable position on the blade. In this respect and referring also to FIG. 6, a pair of transversely oriented and rearwardly extending guide bars 90 and 92 may be provided such that a vehicle operator may line up a dozer blade 100 for proper mounting of the apparatus 10 onto the dozer blade 100. The guide bars 90 and 92 are affixed to the frame body 14 at a rearward location and in spaced-apart positions with sufficient distance between them so as to accept most dozer blade widths which may be applied to carrying the apparatus 10. The guide bars 90 and 92 function to stabilize the apparatus 10 on a dozer blade and these, along with the mounting braces 22, will provide a four-point mounting engagement with a dozer blade.

Figure 6:
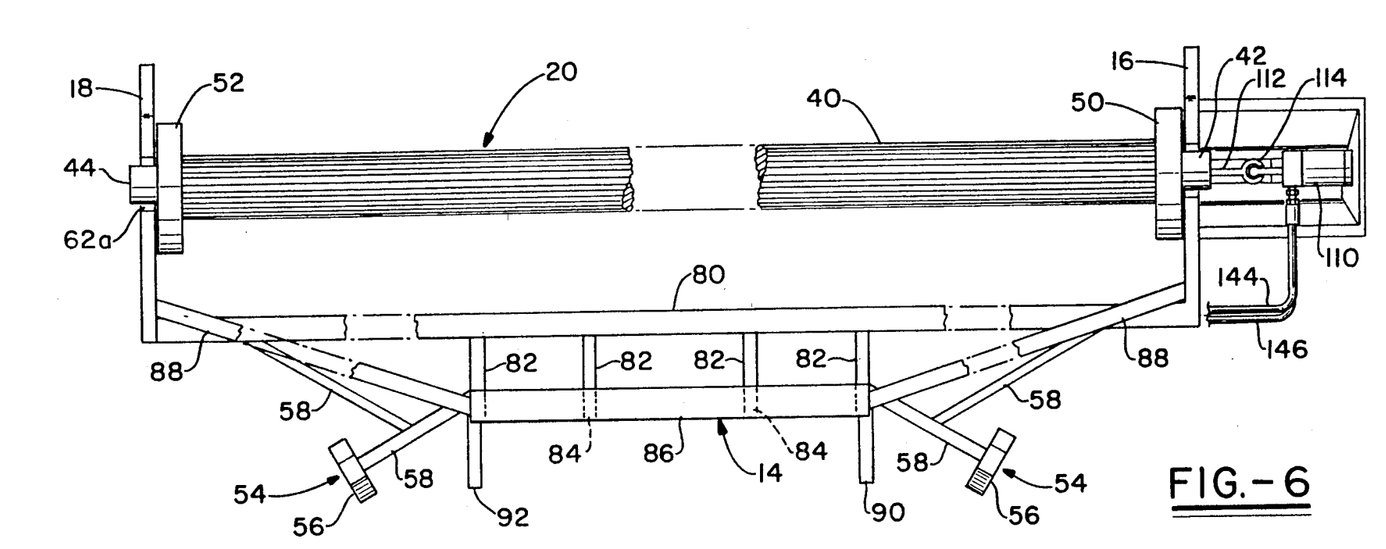
FIG. 6 is a top view, partially broken away, illustrating various features of the apparatus.

The framework 12 may further include at least one leg stand assembly which is indicated generally at reference numeral 54 in FIGS. 2 and 6 of the drawings. The leg stand assembly 54 may comprise a foot member 56 affixed to bracing 58 which extend it rearwardly a sufficient distance such that the apparatus 10 may stand on a ground surface in a substantially stabilized position. The leg stand 54 may also function to place the apparatus 10 in a ready position for mounting and pickup by a dozer blade 100. As illustrated in FIG. 6, two such leg stands 54 may be affixed to the framework 14 for increased stability and these may be angularly positioned rearwardly with reference to a vertical plane of the framework 14.

Figure 7:
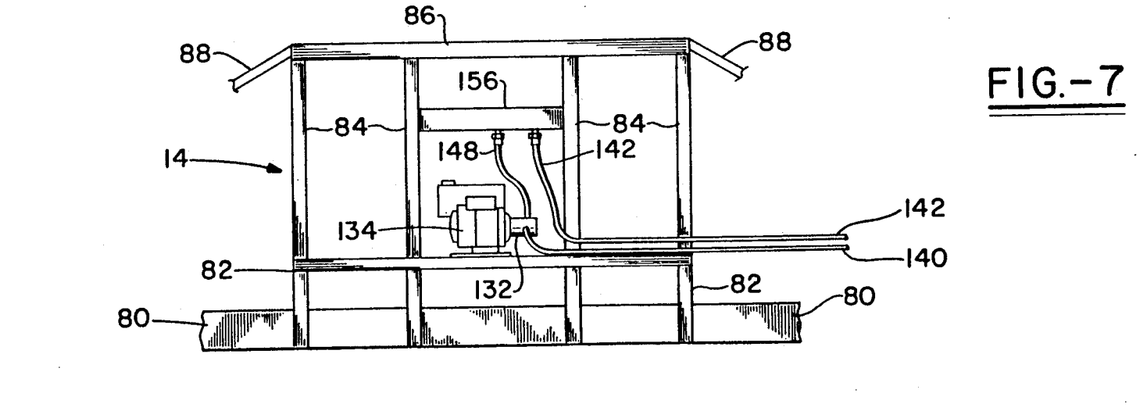
FIG. 7 is a rear elevational view, partially broken away, illustrating an alternative feature of the apparatus.

As alluded to earlier in this description, the apparatus of the invention is preferably configured for powered rotational motion of the arbor assembly 20. This may be accomplished in various ways using various means and a particular one is illustrated in FIGS. 3, 6, and 7 of the drawings. For example, a hydraulic system is illustrated which may be applied to powering the arbor assembly for rotational motion and it comprises a hydraulically operated motor 110 which has a drive shaft 112 coupled to its output through a universal joint 114. The drive shaft 112 is shaped for driving engagement with the drive bore 48 in the end 42 of the mandrel 40. The motor 110 has a base member 116 which is designed for axial movement along the arbor assembly longitudinal Ax axis and this allows one to engage the drive shaft 112 with the mandrel and disengage it from the mandrel as desired. Various means may be used to accomplish this and the one illustrated in the figure comprises a base member 116 in an elongated configuration which may be slidably received within a bore 118 configured into a support plate member 122.

The support plate member 122 forms part of a skid plate assembly 120 which comprises forwardly positioned and rearwardly positioned plate members 124 and 126 respectively and these are affixed at one end to the transverse arm 16 of the framework 12 and at the opposite end they are interconnected via an end plate 128. The plate members 124, 126, and 128 may be affixed at angular orientations to the base plate member 122 to provide easy access to the motor 110 and drive shaft 112. The skid plate assembly 120, while providing a mounting base for the motor 110, also provides limited protection for the motor and drive means from debris which may find its way into the area of the motor.

The motor 110 is driven by a hydraulic fluid pressure received from a pump 132 which is operated by a motor 134 in a conventional manner. The pump 132 is connected to a hydraulic fluid supply provided by a reservoir 136 and the system is operated through a controller 130 located at the operator's station 24 mounted to the apparatus 10. In general terms, the pump 132 provides a hydraulic fluid pressure to a valve assembly 152 of the controller 130 which passes it to the hydraulic motor 110 for rotating the arbor assembly 20. The hydraulic fluid is returned to the reservoir 136 through the valve assembly 152 where it may resupply the pump 132. The hydraulic circuit is thus complete.

More specifically and referring to the hydraulic system as illustrated in FIG. 3 of the drawings, the hydraulic valve assembly 152 is operated by a valve control lever 150 which an operator may use to switch valves to various positions for proper operation of the motor 110. For example, the valve lever 150 may exhibit three operable positions including "forward", "neutral", and "reverse". When the lever is positioned in "neutral" for operation of the valves, the assembly 152 accepts a hydraulic fluid pressure from the pump 132 via a line 140 and returns it to the reservoir 136 via a line 142, which reservoir provides a continuous supply of hydraulic fluid to the pump 132 via a line 148. The "neutral" hydraulic circuit is therefore completed.

When an operator desires to unroll a supply of flexible sheeting material 30 from the mandrel 40, he may shift the valve lever 150 to the "reverse" position which is the direction of reference arrow $A_R$ and which is also the direction of travel of a dozer vehicle over the ground surface to be covered by the sheeting material. Referring to FIG. 3, a dozer vehicle will be moving in reverse and, accordingly, the mandrel 40 will be rotated in a clockwise direction of reference arrow Ar to unroll sheeting material from the mandrel. In this situation, the valve assembly 152 may be adapted to provide a hydraulic fluid pressure to the motor 110 via a line 144 to rotate the motor drive shaft 112 in a clockwise direction. A return of hydraulic fluid will be provided via a line 146 to the valve assembly 152 which directs it back to the reservoir 136 via return 142 and it is then fed back to the pump 132 via line 148. The hydraulic circuit for dispensing flexible sheeting material from the mandrel 40 is thus completed.

Alternatively, when an operator desires to take up the flexible sheeting material 30 and wrap it back onto the mandrel 40, he may shift the valve lever 150 to the "forward" position which is also the direction of travel of a dozer vehicle over the ground surface which is covered by the sheeting material. In this situation, the valve assembly 152 is adapted to provide a hydraulic fluid pressure to the motor 110 via line 146 which reverses motor shaft rotation and the fluid is returned to the valve assembly via line 144 where it is fed back to the reservoir 136 via line 142. The pump 132 is supplied continuously with hydraulic fluid via line 148 and the hydraulic circuit for taking up flexible sheeting material 30 is thus completed.

Figure 8:
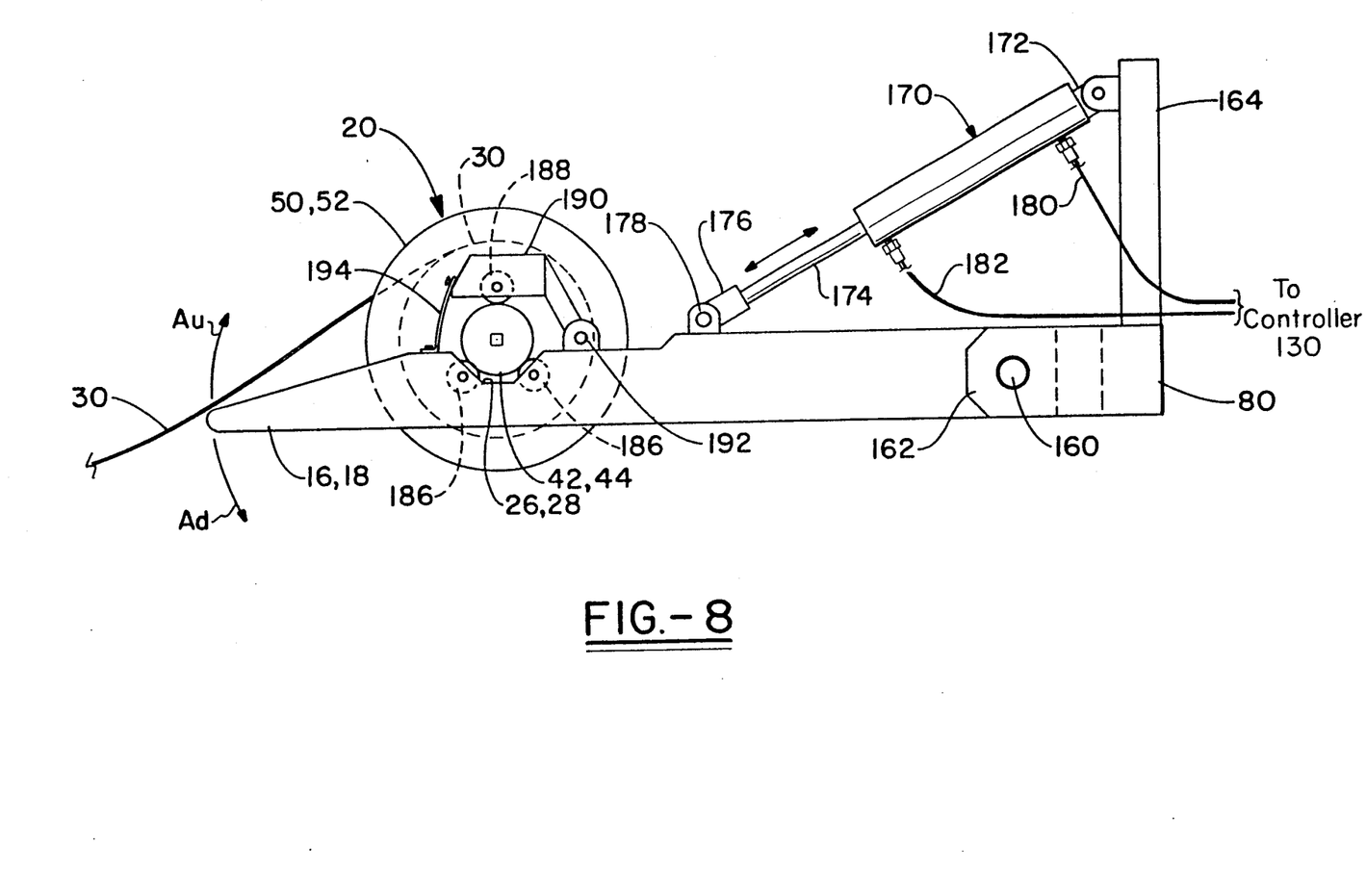
FIG. 8 is a side elevational view illustrating another embodiment for the transversely positioned arms which carry the journalled arbor assembly thereon.

The examples described above assume that the flexible sheeting material 30 is wrapped onto the mandrel 40 according to the direction illustrated in FIGS. 3 and 8. It will, of course, be recognized and it is anticipated that the sheeting material 30 may be wrapped on the mandrel in an opposite orientation wherein it is started on the mandrel at the bottom in contradition to being started at the top as shown in the drawings. In this orientation, the rotational directions described in the examples will be reversed, i.e., unrolling of sheeting off of the mandrel 40 will be in the counterclockwise direction while taking up of the sheeting will be in the clockwise direction. In this respect also, it will be recognized that the valve assembly 152 may be variously configured to operate in other modes of hydraulic valve shifting. The operation as described above, therefore, is intended as an example only and is not considered a limiting factor in the invention.

The hydraulic system will preferably be a self-contained system, i.e., it is completely carried on the apparatus 10. For example and referring to FIG. 7 of the drawings, the motor 134 may be any suitable gasoline powered motor which may be direct-coupled to a hydraulic pump 132. These are mounted to the framework 14 is a position for even weight distribution on the apparatus 10. The hydraulic fluid reservoir 136 may be any conventionally available tank of suitable capacity and it may also be mounted to the framework 14. In a preferred configuration, the reservoir 136 comprises one of the plurality of bracing members of the framework 14. For example and as shown in the figure, a horizontally mounted bracing member 156 may be configured as a tank with suitable capacity and it will be affixed within the framework 14 to functionally serve both purposes, i.e., a supporting brace and a hydraulic fluid reservoir 136. The hydraulic fluid supply line 148 for the pump 132 may be connected into the member 156 as well as the fluid return line 142 from the valve assembly 152.

It will, of course, be recognized and it is anticipated that the hydraulic system may not be a self-contained system as described above, but rather, various elements of the system may be otherwise provided. For example, most vehicles on which the apparatus 10 may be used include complete hydraulic power systems of their own. Accordingly, one may take advantage of this fact and utilize the power of the vehicle engine, the output of its hydraulic pump, and the capacity of its fluid reservoir in the operation of the apparatus 10. Of course, any additional hydraulic fluid capacity may be supplied by the addition of auxiliary tanks or by increasing the capacity of the vehicle hydraulic reservoir. In any event and according to this arrangement, the controller 130 may have quick-connect and disconnect fittings in the hydraulic supply and return lines 140 and 142 respectively and these may tap into the hydraulic system of the vehicle in a conventional manner to provide the necessary power to operate the arbor assembly 20.

In addition, it will also be recognized and it will be apparent to those skilled in power systems, that equivalent electrical and/or pneumatic systems may be applied to the apparatus 10 to rotate the arbor assembly 20. For example in an electrical system, the motor 110 may comprise any suitable electric motor controlled via an electrical switching assembly 152. Electrical power may be provided by a bank of batteries or an electrical generator and these may be carried on the apparatus 10 for a self-contained system. Alternatively, the motor 110 may comprise an air motor controlled via a valve assembly 152 which receives suitable air pressure from a motor 134 and air pump 132 in a conventional manner and these may also be carried on the apparatus 10. These various power systems are considered to be within the scope of the present invention.

Referring now to FIG. 8 of the drawings, an alternative embodiment for the transverse arms 16 and 18 is illustrated and the double numeral designations are used to indicate that both arms 16,18 will be similarly configured. In this embodiment, the arms 16,18 are mounted via pivot pins 160 carried within short extension braces 162 affixed in any suitable manner to the frame base member 80 at each of its ends. A pair of hydraulically operated cylinders 170 each have an end 172 mounted to a post 164 which is carried on and mounted to the frame base member 80. A double-acting piston within each of the cylinders 170 moves an arm 174 which is pivotably connected to a transverse arm extension 16,18 via a pin mount 178. Hydraulic fluid pressure supply and return lines 180 and 182 are provided and connected into the cylinders 170 and also to the controller 130 such that hydraulic fluid pressure may be used to extend or shorten the arm lengths 174 and thus effect a rotation of the arms 16,18 about their pivot pins 160. From this it can be seen that the transverse arm extensions 16,18 may be either rotated downwardly in the direction of reference arrow Ad or rotated upwardly in the direction of reference arrow Au, and this, to facilitate the mounting and demounting of the arbor assembly 20 from the arm extensions 16 and 18.

As hereinbefore alluded to, the weight of the arbor assembly 20 and its cargo of flexible sheeting material 30 may be considerable. This may pose a wear problem at the journal mounts on the extension arms 16,18 and at each end of the arbor assembly. An alternative for either ball-bearing mounts and/or bushing mounts is illustrated in FIG. 8 wherein rollers 186 may be carried within the support groove 26 and 28 in the extension arms 16 and 18 respectively. In this configuration, the arbor assembly terminal ends 42,44 are rotatably carried by the rollers 186 when the arbor assembly is moved onto the arms and into the recesses or support grooves 26,28. In addition, a roller 188 may be provided within retainer members 190 and these may be rotated about support or mounting pins 192 so as to facilitate demounting of the arbor assembly 20. The retainers 190 may also include straps, or springs, or similar means 194 which function to maintain the rollers 188 in contacting engagement with the arbor assembly terminal ends 42 and 44.

Finally, the framework 12 of the apparatus 10 may be fabricated from various materials but it was found that the bracing members 82, 84, and 86 will preferably comprise eight inch by four and one quarter inch tubular steel while the vertical bracing members 22 may comprise six inch by two and one quarter inch tubular steel. A framework 12 of this construction will support the weight of a fifty foot long mandrel 40 and its cargo of flexible sheeting material 30.

While certain representative details have been described and illustrated for the purposes of this description, it will be apparent to those skilled in the various arts which may be applied to the invention that various changes and/or modifications may be made thereto without departing from the spirit or scope of the invention as claimed.

What is claimed is:

1. An apparatus for use in conjunction with a powered vehicle to lay out and take up a long length, wide width flexible sheeting material comprising in combination:

a framework adapted for mounting engagement on a powered vehicle such as to be carried over a ground surface by the vehicle, the framework having a transversely positioned framework arm extending outwardly at each end thereof;

pivot means attaching each arm to the framework;
means associated with each of the framework arms for journal-mounting a shaft between them;
an arbor assembly including a cylindrical mandrel having each of its ends journalled to a framework arm so as to be rotatable about a longitudinal axis, said mandrel adapted for carrying a long length, wide width flexible sheeting material thereon in a wrapped and layered orientation about its surface extent;
means rotating the arms about the pivot means to a lowered position for loading and unloading the mandrel and to a raised position for rotating the mandrel; and
a hydraulic system to power and control the rotation for wrapping flexible sheeting material onto the mandrel and in an opposite direction of rotation for unwrapping sheeting material from the mandrel;
the wrapping and unwrapping of the flexible sheeting material being accomplished as the powered vehicle is moved to travel over a ground surface area;
the hydraulic system comprising: a hydraulically operated motor mounted on at least one end of the arbor assembly and having a drive shaft engageable with the mandrel, a means to provide hydraulic fluid pressure, a reservoir to provide a source of hydraulic fluid, a hydraulic valve control means to switch hydraulic fluid pressure from the means providing said pressure to the motor driving the mandrel and to return the hydraulic fluid to the reservoir, and a hydraulic fluid circuit comprising a pair of hydraulic fluid pressure lines interconnecting the control means with the motor driving the mandrel, a hydraulic fluid pressure line interconnecting the control means with the means providing the hydraulic fluid pressure, a hydraulic fluid line interconnecting the control means with the reservoir, and a hydraulic fluid line interconnecting the reservoir with the means providing the hydraulic fluid pressure.

2. The apparatus as claimed in claim 1 wherein the framework comprises a pair of rearwardly positioned and vertically extending braces configured to hook the framework onto a dozer blade of a powered vehicle.

3. The apparatus as claimed in claim 1 wherein the framework further comprises leg stand means mounted to the framework and positioned rearwardly of the framework to maintain the apparatus in an upright position when it is demounted from a vehicle and placed on a ground surface.

4. The apparatus as claimed in claim 1 wherein the arbor assembly further comprises a circular disk mounted at each end of the mandrel between the framework arms, the disks each exhibiting a diameter greater than a mandrel diameter such that when the arbor assembly is demounted from the framework arms and placed on a ground surface they function to maintain flexible sheeting material carried on the mandrel off of the ground surface while also providing a means for rolling the arbor assembly over the ground surface.

5. The apparatus as claimed in claim 1 wherein the means providing hydraulic fluid pressure comprises a gasoline-powered motor coupled to a hydraulic pump and it and the reservoir are carried on and mounted to the framework.

6. The apparatus as claimed in claim 5 wherein the reservoir is configured and comprises one of a plurality of support brace members which comprise the framework.

7. The apparatus as claimed in claim 1 wherein the means associated with each of the framework arms for journal-mounting a shaft between them comprises a bushing configuration, a portion of a bushing being carried within an axial groove in each arm while another portion is carried within a latch member which rotates to capture an end of the mandrel for rotational motion between them.

8. The apparatus as claimed in claim 1 wherein the means associated with each of the framework arms for journal-mounting a shaft between them comprises a configuration of rollers carried within an axial support groove in each arm and within a latch member which rotates to capture an end of the mandrel for rotational motion between them.

9. An apparatus for use in conjunction with a powered dozer type vehicle to lay out and take up a long length, wide width flexible sheeting material comprising in combination:
a wide width framework having means which extends rearwardly therefrom for mounting engagement onto a dozer blade of the vehicle and having a transversely positioned framework arm extending outwardly and forwardly at each end thereof;
means associated with each said arm for journal-mounting a shaft between them;
an arbor assembly including a long length mandrel having each of its end journalled to a framework arm so as to be rotatable about a longitudinal axis of the mandrel, said mandrel adapted for carrying a long length, wide width flexible sheeting material thereon in a wrapped and layered orientation about its surface extent; and
a hydraulic power and control system for effecting rotation of the mandrel in a first direction of rotation for wrapping flexible sheeting material onto the mandrel and in an opposite direction of rotation for unwrapping sheeting material from the mandrel;
the wrapping and unwrapping of the flexible sheeting material being accomplished as the powered vehicle is moved to travel over a ground surface area;
each of the transversely positioned framework arms being affixed to the framework via a pin providing rotation of the arm about a pin axis, each said arm being positionable by a double-acting hydraulic cylinder having hydraulic fluid pressure supply and return lines connected into the control system such that the arms may be hydraulically lowered for mounting of the arbor assembly onto the arms and raised in a position for operation of the mandrel.

10. The apparatus as claimed in claim 9 wherein the hydraulic power and control system is carried within and mounted to the framework and comprises:
a hydraulically operated motor mounted at one end of the arbor assembly and having an output shaft in driving engagement with the mandrel;
a gasoline motor and hydraulic pump assembly to provide a hydraulic fluid pressure;
a fluid reservoir to provide a source of hydraulic fluid;
a hydraulic valve controller to switch a hydraulic fluid pressure from the pump to the motor driving the mandrel and to return hydraulic fluid to the reservoir; and a hydraulic circuit comprising hydraulic fluid pressure supply and return lines connecting the controller to the motor driving the mandrel, a hydraulic fluid pressure line connecting the controller to the pump, a hydraulic fluid line connecting the controller to the reservoir and, a hydraulic fluid line connecting the reservoir to the pump.

11. The apparatus as claimed in claim 9 wherein the means associated with each arm for journal-mounting a shaft between them comprises a bushing configuration wherein a portion of a bushing is carried within an axial groove in each arm for receiving an end of the mandrel therein and a portion of a bushing is carried within a latch member which is rotatable to capture the end of the mandrel for rotational motion between them.

12. The apparatus as claimed in claim 9 wherein the means associated with each of the framework arms for journal-mounting a shaft between them comprises a configuration of rollers carried within an axial groove in each arm for receiving an end of the mandrel therein and within a latch member which is rotatable to capture the end of the mandrel for rotational motion between them.

13. The apparatus as claimed in claim 9 wherein framework further comprises leg stand means extending position when it is demounted from a vehicle and placed on a ground surface.

14. The apparatus as claimed in claim 9 wherein the arbor assembly further comprises a circular disk carried at each end of the mandrel between the framework arms, said disks each having a diameter greater than a mandrel diameter and an amount of flexible sheeting material carried on the mandrel to the extent that when the arbor assembly is demounted from the framework arms and placed on a ground surface, the disks function to maintain the sheeting material off of the ground surface while also providing a means for rolling the arbor assembly over the ground surface.

15. The apparatus as claimed in claim 9 wherein the mandrel is characterized by a plurality of longitudinally extending ribs about its surface extent to facilitate wrapping of a flexible sheeting material onto the mandrel.

16. The apparatus as claimed in claim 10 wherein the output shaft of the hydraulically operated motor is coupled to the mandrel through a universal joint and the motor is movable in line axially with respect to the mandrel so as to be disengagable from the mandrel.

17. The apparatus as claimed in claim 1 wherein the mandrel exhibits a surface contour which facilitates wrapping of a flexible sheeting material onto its surface with a minimum of slippage.

18. The apparatus as claimed in claim 17 wherein the surface contour comprises a plurality of longitudinally extending ribs about its surface extent.

19. An apparatus for use in conjunction with a powered vehicle to alternately deposit and remove a surface cover of long length, wide width flexible sheeting material, the apparatus comprising:
- a vertical truss member having one of its sides adapted for mounting on a powered vehicle capable of traveling backward and forward over a surface to be covered with or uncovered from the surface cover;
- said truss member extending transversely of the direction of travel of the vehicle when in use;
- a mandrel support arm extending outwardly from the side of the truss member facing away from the support vehicle at each end of the truss member for rotatably supporting each end of the mandrel carrying a roll of surface cover material, the mandrel support arms being moveable between a mandrel loading/unloading position and a mandrel rotating position, each mandrel support arm having a locking mechanism for rotatably securing an end of a mandrel to the outwardly extending end of the support arm;
- a mandrel removably mounted on the mandrel support arms for rotation about a longitudinal axis, said mandrel being spaced a sufficient distance from the truss member to provide clearance between the truss member and the periphery of a full roll of surface cover material so that the roll will rotate freely in either desired direction;
- power means to cause rotation of the mandrel; and
- control means to regulate the direction of rotation and speed of rotation of the mandrel in relation to the direction of travel of the vehicle so that the cover material can be alternately unwrapped from the mandrel or rewrapped onto the mandrel as the vehicle moves in one direction or another over a surface to be covered or uncovered.

20. The apparatus as claimed in claim 19 wherein the mandrel support arms are pivotally mounted with respect to the truss member and wherein an actuation means is connected between the truss member and the mandrel support arms to selectively raise and lower the mandrel support arms.

21. The apparatus as claimed in claim 19 wherein the power means derives operating energy from the powered vehicle on which the apparatus is mounted.

22. The apparatus as claimed in claim 1 wherein the means rotating the framework arms about the pivot means is a pair of hydraulic cylinders, each cylinder having one end connected to one of the framework arms and the opposite end connected to the framework, the cylinders being operatively connected to the hydraulic system of the apparatus.

* * * * *